Figures 1, 2:
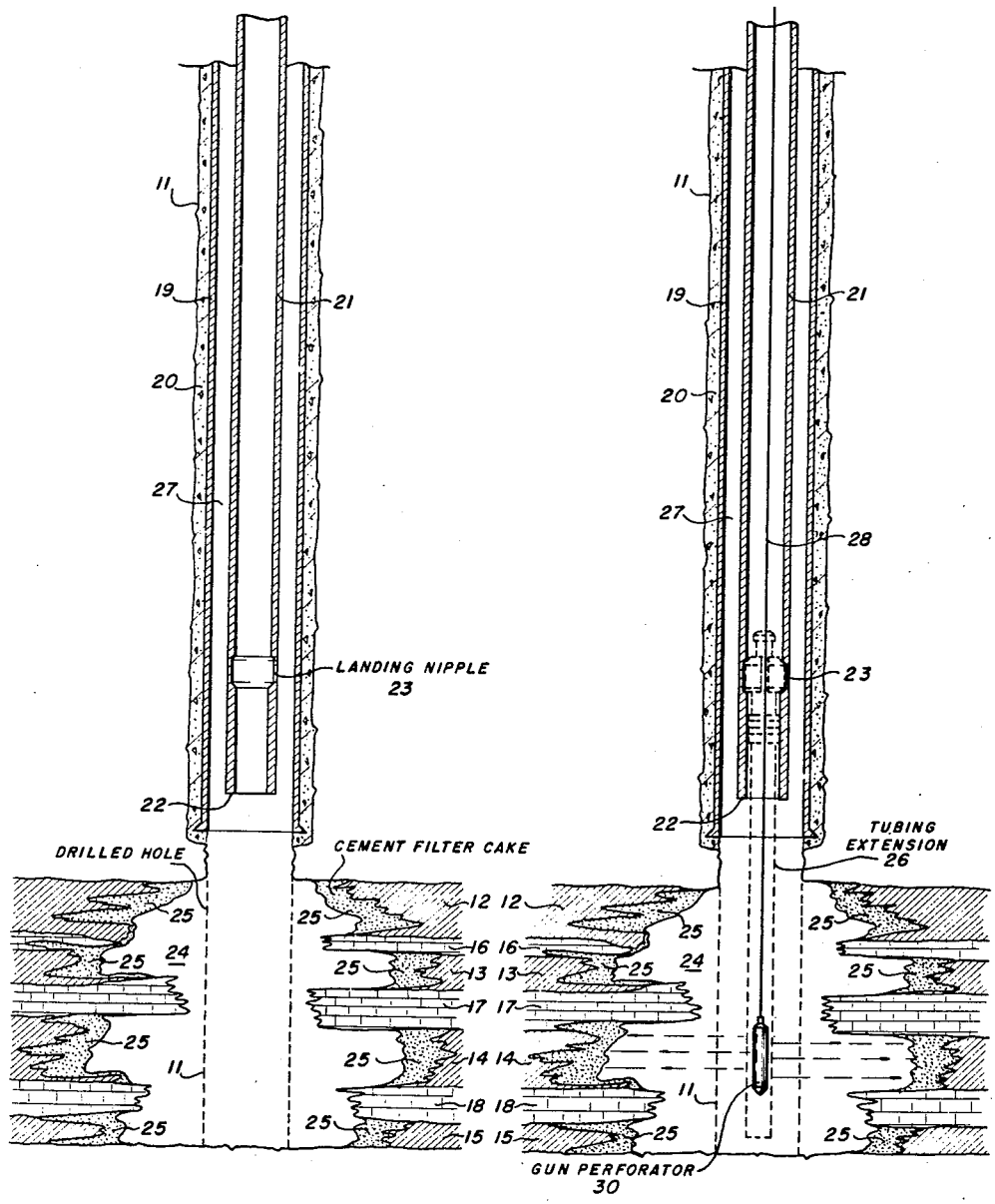

Jan. 1, 1957   J. L. RIKE   2,776,010
SEALING POROUS EARTH STRATUM
Filed Dec. 29, 1954

INVENTOR.
James L. Rike,
BY
ATTORNEY.

2,776,010

SEALING POROUS EARTH STRATUM

James L. Rike, Midland, Tex., assignor, by mesne assignments, to Esso Research and Engineering Company, a corporation of Delaware Application December 29, 1954, Serial No. 478,391

13 Claims. (Cl. 166—21)

The present invention is directed to sealing a porous earth stratum. More particularly, the invention is directed to a method for cementing in a borehole penetrating porous strata and earth formations. In its more specific aspects, the invention has to do with cementing in an open hole below a casing to seal off porous zones.

The present invention may be briefly described as a method for sealing a porous stratum of an earth formation penetrated by a well bore in which a low fluid loss cement slurry is introduced into the well bore into contact with the exposed face of the porous stratum. The cement slurry has a density in the range from about 9 to about 13.5 pounds per gallon and is of the type in which there is a low loss of fluid to the porous stratum. Pressure is then imposed on the slurry in the borehole not in excess of the incipient breakdown pressure of the formation to form a thin filter cake of cement on the exposed face of the stratum to seal the stratum. Thereafter, excess fluid cement is removed from the well bore.

It is contemplated in the present invention that in an open hole below the casing a plurality of porous strata may be sealed and a selected zone may then be perforated to open up fluid communication into the well bore. The perforation of the sealed zone or zones may be performed by lowering a gun perforator through the casing or the tubing string, the gun perforator being of the shaped charge or bullet type, as desired.

In the practice of the present invention, it is contemplated further that fluid may be flowed between the selected zone and the well bore to produce a desirable earth fluid, such as hydrocarbons, contained in oil and gas earth fluids and the like. It is also contemplated in the present invention that fluids may be injected into the selected zone, such as water, gas, or other fluids for stimulation or secondary recovery operations.

The present invention further contemplates shooting a borehole below the casing to open up a cavity and thereafter sealing off the porous zones in the cavity followed by penetrating a selected zone of the sealed strata.

The cement slurry employed in the present invention is preferably a cement slurry which has a low fluid loss and has a low density, preferably in the range from about 9 to about 13.5 pounds per gallon. The cement slurry may suitably be an aqueous base slurry, an oil base slurry, or an oil-emulsion base slurry. The slurry may suitably be oil, cement, and Bentone.

The cement composition or slurry may be a composition containing bentonite as of the type described in the patent to Salathiel, 2,582,459, issued January 15, 1952.

A suitable cement slurry may be an oil slurry, such as one containing a hydrocarbon and cement. For example, a cement slurry in which the hydrocarbon is kerosene, diesel oil, light lubricating oil fractions, and the like, or a heavy naphtha boiling in the range from 300° to 600° F. may be formed from the hydrocarbon and Portland cement or other materials, such as pozzolan and the like.

The cement may be used in the oil slurry in amounts ranging from about 50 to 700 pounds per barrel of oil with good results being obtained in amounts from about 100 to 600 pounds per barrel of oil. Such cement slurries of oil and cement may suitably contain a Bentone which is a reaction product of bentonite. The reaction is a base exchange reaction and the Bentone is prepared by treating a water slurry of high grade sodium bentonite with one of the larger quaternary ammonium complexes; for example, the water soluble salts, such as octadecylammonium or dioctadecylammonium chloride, and the like. An ion exchange reaction takes place to produce a flocculated organophilic bentonite. The product of the reaction, commonly called a Bentone, is recovered by filtering, washing, drying and re-grinding. A description of the Bentones may be found in Chemical Engineering, March 1952, pages 226 to 230. The Bentone may be employed in amounts of about 2 to about 10 pounds per barrel of oil.

A solvation agent may be employed in the oil slurry along with the Bentone in an effective amount of about 3 pounds per barrel of oil or less. The solvation agent is used in the sense of the solvation agents referred to in the paper "Organophilic Bentonites. Swelling in Organic Liquids" by John W. Jordan, The Journal of Physical and Colloid Chemistry, vol. 53, No. 2, February 1949, and in the article "Organophilic Bentonites. II—Organic Liquid Gels" by J. W. Jordan, B. J. Hook and C. M. Finlayson, The Journal of Physical and Colloid Chemistry, vol. 54, No. 8, November 1950. The solvation agent may suitably be an aliphatic alcohol, such as methyl alcohol, ethyl alcohol, propyl and butyl alcohols, ethylene glycol monomethyl ether, diethylene glycol monoethyl ether, the ketones, such as acetone, methyl ethyl ketone and other ketones of the same homologous series.

The cement slurry also may suitably be a composition formed by mixing water and a liquid hydrocarbon having a viscosity at 100° F. of less than 40 centipoises with Portland cement and a water soluble organic dispersing agent, such as a water soluble salt of phenol-formaldehyde condensation product or a calcium salt of lignin sulfonic acid in a range between 0.1% and 1% by weight based on the dry cement to form a pumpable slurry, the water and hydrocarbon being used respectively in an amount in the range between 50 cc. and 100 cc. and in the range between 14 cc. and 60 cc. per 100 grams of the dry cement. Other emulsion cement slurries of this nature have a low fluid loss and have densities in the range from about 9 to about 13.5 pounds per gallon.

The organic dispersing agent employed in the oil emulsion cements may also include the aliphatic sulfonic acids and the water soluble salts of lignin and its derivatives.

These oil emulsion cements may suitably employ as the organic dispersing agents diethylene glycol monolaurate and polyalkylene ether alcohol.

It is also contemplated that the slurry employed in the present invention may include oil emulsion cements which contain emulsifying compounds which are polar, hydrophilic and lipophilic non-ionic compounds and the cationic alkyl substituted quaternary ammonium salts. The polar emulsifying compounds are of the ester, ether-alcohol, ether-ester type and may be exemplified by compounds such as sorbitan monolaurate, a condensation product of ethylene oxide, propylene oxide, and propylene glycol, polyoxyethylene lauryl alcohol, polyoxyethylene octyl phenol, and the like. Cetyl triethyl ammonium chloride as well as other alkyl substituted quaternary ammonium salts may suitably be used as the organic dispersing agent in the oil-emulsion cements comprising Portland cement, liquid hydrocarbon and water to form a pumpable slurry.

In the oil emulsion cements of the nature described, a small amount of colloidal clay, such as Wyoming bentonite clay, El Paso surface clay and those clays including the montmorillonites and particularly the sodium montmorillonite may be used. Calcium montmorillonite may be employed and suitable other salts of the montmorillonites may be used. The sodium montmorillonites are encountered in Wyoming bentonite and are the preferred type of clay. Clays falling within the purview of this invention, suitable for use in oil emulsion cements, are described in the Salathiel patent supra and are also described in the Carmen patent, 1,460,788, and in the Harth patent, 1,991,637. When clay is employed in the oil emulsion cement, it suitably may be used in amounts less than 5% by weight based on the dry cement, whereas in the aqueous base slurry, such as described in the patent to Salathiel supra, larger amounts of clay are used.

In the practice of the present invention the slurry of cement has a density not in excess of about 13.5 pounds per gallon. Cement slurries having densities as low as about 9 pounds per gallon may be used. The low fluid loss slurries of the nature described having low densities allow the formation of a thin filter cake of cement on the exposed face of the porous earth stratum but yet effectively seal the porous earth stratum from a well bore when pressure is imposed on the slurry not in excess of the incipient breakdown pressure of the formation.

The present invention will be further illustrated by reference to the drawing in which:

Fig. 1 is a schematic view of a hydrocarbon productive interval penetrated by a well bore after cementing operations have been performed; and Fig. 2 is a similar view to Fig. 1 showing perforation of a selected sealed zone.

Referring now to the drawing in which identical numerals will be employed to designate identical parts, numeral 11 designates a well bore which has been drilled to penetrate a plurality of hydrocarbon productive zones 12, 13, 14, and 15 separated by non-productive intervals 16, 17, and 18. A casing, such as 19, is arranged in the well bore 11 and is suitably sealed therein with primary cement 20. A tubing 21 is arranged in the casing 19 with its lower open end 22 above the first porous zone 12. The tubing 21 may have a landing nipple 23 provided in the lower end thereof. This landing nipple is of the type described in the Composite Catalog of Oil Field and Pipeline Equipment, 1954-55 edition, page 3989.

The well bore 11 after having penetrated zones or strata 12, 13, 14, 15, 16, 17, and 18 may suitably be shot with nitroglycerin to open up a cavity 24 therein to enlarge the well bore 11, as shown in Fig. 1. Thereafter a low fluid loss cement slurry having a density in the range from about 9 to about 13.5 pounds per gallon is pumped down the tubing 21 to fill substantially completely the cavity 24 with cement. Pressure is then exerted on the cement slurry filling the cavity 24 for a sufficient length of time to form the filter cake 25. This pressure should not exceed the incipient breakdown pressure of the formation comprised of the zones 12 to 18, inclusive. In other words, a low pressure squeeze is used only sufficient to form the filter cake 25 and insufficient to force cement out into the porous zones penetrated by the well bore 11. This low pressure will vary, of course, with the depth of the well and the formation characteristics and may range from 100 to 3000 pounds per square inch. For example, in a well such as has been described drilled to 15,000 feet a squeeze pressure of 800 pounds per square inch may be employed for forming a filter cake as has been described.

The porous zones 12, 13, 14 and 15 will absorb, in the case of the aqueous base slurries, water from the slurry and cause the formation of a thin filter cake, such as 25, on the exposed face of the porous zones 12, 13, 14 and 15 which will effectively seal off the porous zones or intervals.

In the case where oil slurry is used, interstitial water in the porous zones or intervals will cause the formation of a thin filter cake by contact with the cement solids or the thin filter cake may be formed by forcing water into contact with the cement solids on the exposed faces of the several zones after removing excess fluid cement.

Assuming that an aqueous base slurry has been used and the filter cake 25 has been formed, excess fluid cement is then removed from the cavity 24 by lowering a tubular extension member 26 through the tubing 21 and supporting and/or anchoring same in the landing nipple 23. Thereafter an aqueous medium, such as fresh and/or salt water or a hydrocarbon vehicle and the like, may be forced down the annulus 27 to cause the excess fluid cement in the cavity 24 to be forced out the tubing 21 upwardly through the tubular extension member 26. Thereafter, the tubular extension member 26 is retrieved from the landing nipple 23 by a wire line fishing tool and a gun perforator 30 of the shaped charge or bullet type is then lowered on wire line 28 opposite a selected interval, such as 14. The gun perforator is then fired to open up fluid communication between the sealed interval 14 and the well bore 11 or into the cavity 24 which communicates with the well bore 11. Fluid may then be flowed from the zone 14 by reducing the pressure in the well bore such as by pumping or swabbing or by releasing pressure at the well head to allow hydrocarbon production up the tubing 21.

It is also possible to inject fluid into the formation after penetrating same, such as in the perforated, sealed stratum 14. This fluid may be oil, gas, water, or any other fluid which may be suitably used in selective flooding or secondary recovery operations. The fluid may suitably be a hydrocarbon and the like.

It is also contemplated that a second selected interval may be perforated after sealing same. This may be accomplished by lowering the gun perforator 30 opposite a second selected zone, such as zone 15 or zone 12, as may be desired, firing same, and fluid communication thus opened up between the cavity or borehole 11 and the second selected zone, such as 15 or 12, and production and/or injection of fluids then had.

The present invention is particularly applicable to oil and gas reservoirs which may produce from several pay intervals which appear continuous throughout the field or over large portions of a field. These productive streaks or intervals will often be separated by impermeable beds or some degree of communication may exist between the productive intervals.

During primary production the productive zones may be produced in stages or simultaneously. In such operations, the pipe is located above the uppermost productive interval after drilling has been conducted through all of the productive intervals. Initial stimulation may include shooting an open hole section with a high explosive, such as nitroglycerine, which forms a large irregular cavity into which the several productive or pay intervals may drain.

The several productive intervals seldom exhibit equal permeability and productivity. When fluid injection is employed, the fluid injection will result in a major portion of the fluid entering one porous stratum or a small percentage of the total interval. Where stimulation is being conducted in a pattern flood, one injection well may flood one zone while others may flood different zones. Since maximum flood efficiency is obtained with complete closure of injection wells around the producing well or wells in a given interval, each zone must be isolated for injection and flooded separately.

The conventional practice of setting and cementing a liner or an additional string of pipe through the interval of porous zones is not usable where nitroglycerine shooting is practiced for open hole completions since large cavities permit a sheath of cement to be formed between the pipe and wall of the hole which exceeds the penetration ability of currently available gun perforators, and the like.

In the present invention where a cement slurry is used having the characteristic of depositing a thin filter cake and having a low fluid loss and low density, the cement slurry may be spotted over the total completion interval and by closing the surface opening to the annular area between the tubing and casing, a low pressure squeeze may be applied, forming a filter cake of cement on the various productive intervals regardless of size or irregularity of shape of the hole. After obtaining a low squeeze pressure sufficient to leave a thin sheath of cement on all porous intervals but insufficient to break down the formation, the remaining fluid cement is circulated out of the hole so that the cement sheath is confined to the thin cake formed as a cement slurry sets up on the exposed face of the porous zone. Thus the water filters from the cement into the porous medium or oil bearing formation from the casing where an aqueous slurry is used. In the case where interstitial water contacts the cement solids deposited on the face of the porous stratum where oil base slurries are used a thin filter cake is also formed. Such thin layers of cement filter cake being penetratable by gun perforators available on the market.

The desired productive interval may be perforated for injection or production, as the case may be, and all injected fluid or product limited to a selected interval. When the selected interval is ready for abandonment of the recovery process in effect, a similar low pressure squeeze may be reapplied and the next interval opened for flood or production. If the zones are to be flooded from the bottom up it may be desirable to seal off completely the lowermost abandoned interval if no further use of the zone is contemplated.

The present invention is adaptable for selective flooding with workovers being performed with wire line tools as has been described. In the present invention the cement may be spotted conveniently using a tubular extension member landed in a landing nipple in the lower end of the tubing, pressure applied through the tubing and/or through the tubing-casing annulus not in excess of the incipient breakdown pressure of the formation and thereafter excess fluid cement may be removed by circulating fluid down the casing-tubing annulus. After the excess fluid cement is removed, gun perforation of selective intervals or zones may be performed and fluid either injected into or produced from the perforated intervals.

The nature and objects of the present invention having been completely described and illustrated, what I wish to claim as new and useful and to secure by Letters Patent is:

1. A method for working over a well bore penetrating a plurality of porous hydrocarbon strata wherein a casing is set above the uppermost of said porous strata comprising setting a tubing string in said casing the lower end of which is positioned above the uppermost of said hydrocarbon strata, shooting said well below the lower ends of said casing and said tubing with an explosive charge thereby forming a cavity in said well, introducing into said cavity a low fluid loss cement slurry having a density range of 9 to 13.5 pounds per gallon, imposing a low squeeze pressure on said slurry sufficient to form a thin filter cake of cementitious material on said strata in said cavity, circulating out excess fluid cement, perforating a selected porous stratum in said cavity and then flowing fluids through the perforations formed in said selected stratum.

2. A method as recited in claim 1 wherein said slurry contains bentonite.

3. A method as recited in claim 1 wherein said slurry is an oil emulsion.

4. A method as recited in claim 2 wherein said slurry comprises oil and cement.

5. A method as recited in claim 1 wherein the slurry comprises oil, cement and a high grade sodium bentonite reacted with one of the larger quaternary ammonium complexes.

6. A method as recited in claim 1 wherein the slurry is an oil emulsion containing bentonite.

7. A method as recited in claim 1 wherein said fluids flowing through said perforations are production fluids.

8. A method as recited in claim 7 wherein each of said additional porous strata are sequentially perforated and produced following perforation and production of said selected stratum.

9. A method as recited in claim 1 wherein said fluids flowing through said perforations are fluids injected into said perforated selected stratum from said well bore.

10. A method as recited in claim 9 wherein each of said plurality of strata are sequentially perforated, injected with fluid and then sealed off with said cement slurry.

11. A method of treating a well bore penetrating a plurality of porous hydrocarbon strata having a casing and a tubing positioned therein the lower ends of which are arranged above the uppermost of said porous strata, comprising shooting said well below the lower end of said casing and tubing with an explosive charge thereby forming a cavity in said well in said porous hydrocarbon strata, introducing into said cavity a low fluid loss cement slurry having a density range of 9 to 13.5 pounds per gallon, imposing a low squeeze pressure on said slurry sufficient to form a thin filter cake of cementitious material on said strata, circulating out excess fluid cement, perforating a selected stratum in said cavity, and then flowing fluids through the perforations formed in the selected stratum.

12. A method as recited in claim 11 wherein said fluids flowing through said perforations are production fluids.

13. A method as recited in claim 11 wherein said fluids flowing through said perforations are fluids injected into said perforated selected stratum from said well bore.

References Cited in the file of this patent

UNITED STATES PATENTS

| | | |
|---|---|---|
| 2,582,459 | Salathiel | Jan. 15, 1952 |
| 2,585,378 | Farris | Feb. 12, 1952 |
| 2,591,807 | Greene | Apr. 8, 1952 |
| 2,614,634 | Lea et al. | Oct. 21, 1952 |

OTHER REFERENCES

"Development of Gun Perforator Methods That Cut Production Costs," published in "Tomorrow's Tools Today," August 1939.